US012633517B2

(12) United States Patent
Chen et al.

(10) Patent No.: US 12,633,517 B2
(45) Date of Patent: May 19, 2026

(54) ELECTROCHEMICAL DEVICE AND ELECTRONIC DEVICE

(71) Applicant: Ningde Amperex Technology Limited, Ningde (CN)

(72) Inventors: Maohua Chen, Ningde (CN); Daguang Li, Ningde (CN); Xiaoping Lin, Ningde (CN); Yuansen Xie, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 770 days.

(21) Appl. No.: 17/708,300

(22) Filed: Mar. 30, 2022

(65) Prior Publication Data

US 2022/0320484 A1 Oct. 6, 2022

Related U.S. Application Data

(63) Continuation of application No. PCT/CN2021/084575, filed on Mar. 31, 2021.

(51) Int. Cl.
| | |
|---|---|
| *H01M 4/134* | (2010.01) |
| *H01M 4/02* | (2006.01) |
| *H01M 4/36* | (2006.01) |
| *H01M 4/62* | (2006.01) |
| *H01M 10/052* | (2010.01) |

(52) U.S. Cl.
CPC ........... *H01M 4/134* (2013.01); *H01M 4/366* (2013.01); *H01M 4/62* (2013.01); *H01M 10/052* (2013.01); *H01M 2004/021* (2013.01); *H01M 2004/027* (2013.01); *H01M 2220/30* (2013.01)

(58) Field of Classification Search
CPC ............. H01M 4/80; H01M 2004/021; H01M 10/052; H01M 4/366; H01M 4/382; H01M 4/808; H01M 50/489; H01M 50/471; H01M 50/474; H01M 50/477; H01M 50/491
See application file for complete search history.

(56) References Cited

U.S. PATENT DOCUMENTS

| | | | |
|---|---|---|---|
| 2016/0036059 A1 | 2/2016 | Tokune et al. | |
| 2017/0062830 A1* | 3/2017 | Bao | H01M 4/661 |
| 2017/0294688 A1* | 10/2017 | Jang | H01M 4/366 |

(Continued)

FOREIGN PATENT DOCUMENTS

| | | |
|---|---|---|
| CN | 107799736 A | 3/2018 |
| CN | 108232117 A | 6/2018 |

(Continued)

OTHER PUBLICATIONS

Machine translation of CN-208111570-U (Year: 2018).*
International Search Report mailed Dec. 30, 2021, corresponding to International Application No. PCT/CN2021/084575; 4 pages.

*Primary Examiner* — Jessie Walls-Murray
(74) *Attorney, Agent, or Firm* — Maier & Maier, PLLC

(57) ABSTRACT

An electrochemical device includes a negative electrode. The negative electrode includes a current collector layer, a lithium metal layer, and a porous framework layer that are arranged in sequence. The porous framework layer is partly intercalated in the lithium metal layer. A thickness by which the porous framework layer is intercalated in the lithium metal layer is 0.2 μm to 50 μm. The electrochemical device achieves excellent cycle performance and relatively high safety and reliability.

17 Claims, 1 Drawing Sheet

(56)  References Cited

U.S. PATENT DOCUMENTS

| | | | | |
|---|---|---|---|---|
| 2018/0026271 A1* | 1/2018 | Oh | ...................... | H01M 4/1395 |
| | | | | 429/231.95 |
| 2019/0081346 A1* | 3/2019 | Yun | ................... | H01M 10/4235 |
| 2019/0386296 A1* | 12/2019 | He | ...................... | H01M 10/052 |
| 2020/0006779 A1* | 1/2020 | Lee | ........................ | H01M 4/78 |
| 2021/0020912 A1* | 1/2021 | Xiao | ................. | H01M 4/1395 |
| 2021/0210753 A1* | 7/2021 | Gazda | .................. | H01M 4/134 |

FOREIGN PATENT DOCUMENTS

| | | | |
|---|---|---|---|
| CN | 108292759 A | | 7/2018 |
| CN | 208111570 U | * | 11/2018 |
| CN | 109873162 A | | 6/2019 |

* cited by examiner

ELECTROCHEMICAL DEVICE AND ELECTRONIC DEVICE

CROSS REFERENCE TO RELATED APPLICATIONS

The present application is a bypass continuation application of PCT application PCT/CN2021/084575, filed on Mar. 31, 2021, the disclosure of which is hereby incorporated by reference in its entirety.

TECHNICAL FIELD

This application relates to the electrochemical field, and in particular, to an electrochemical device and an electronic device.

BACKGROUND

Lithium-ion batteries are widely used in the field of consumer electronics by virtue of many advantages such as high volumetric and gravimetric energy densities, a long cycle life, a high nominal voltage, a low self-discharge rate, a small size, and a light weight. In recent years, with rapid development of electric vehicles and portable electronic devices, people are posing higher requirements on the energy density, safety, cycle performance, and the like of the battery, and are expecting the rollout of a new lithium-ion battery with overall performance enhanced comprehensively.

Lithium metal is characterized by a small relative atomic mass (6.94), a low standard electrode potential (−3.045 V), and a high theoretical specific capacity (3860 mAh/g). Therefore, by using the lithium metal as a negative electrode of the battery accompanied by some positive electrode materials of a high energy density, the energy density of the battery and the working voltage of the battery can be greatly increased. However, the lithium metal is relatively active and is prone to a series of side reactions with organic micromolecules in an electrolytic solution system. Consequently, the lithium metal and the electrolytic solution are consumed concurrently, and the cycle Coulombic efficiency is low. Secondly, during charging, lithium is deposited on a surface of a negative current collector. Due to inhomogeneity of a current density and a lithium-ion concentration in the electrolytic solution, deposition speed is too fast at some sites during the deposition, thereby forming sharp dendrite structures. The sharp dendrite structures reduce the energy density of the lithium-ion battery and even pierce a separator, give rise to a short circuit, and cause a safety problem. Finally, during charging and discharging of the battery, a negative electrode plate expands and shrinks violently in thickness. Consequently, a coating on the negative electrode plate is prone to peel off, thereby affecting the cycle performance of the lithium-ion battery.

SUMMARY

An objective of this application is to provide an electrochemical device and an electronic device to improve the cycle performance, safety, and reliability of the electrochemical device.

It needs to be noted that in the following content, this application is construed by using a lithium-ion battery as an example of the electrochemical device, but the electrochemical device according to this application is not limited to the lithium-ion battery.

Specific technical solutions are as follows:

A first aspect of this application provides an electrochemical device. The electrochemical device includes a negative electrode. The negative electrode includes a current collector layer, a lithium metal layer, and a porous framework layer that are arranged in sequence. The porous framework layer is partly intercalated in the lithium metal layer. A thickness by which the porous framework layer is intercalated in the lithium metal layer is 0.2 μm to 50 μm.

In this application, the porous framework layer is partly intercalated in the lithium metal layer. Therefore, the lithium metal layer can replenish lithium consumed during cycling, thereby improving the cycle performance of the electrochemical device. In addition, the porous framework layer is partly intercalated in the lithium metal layer. The thickness by which the porous framework layer is intercalated in the lithium metal layer is controlled to be 0.2 μm to 50 μm. Due to low rigidity of the lithium metal layer, electrical contact between the current collector layer and the porous framework layer can be effectively improved to ensure homogeneity of current transmission and effectively avoid the generation of lithium dendrites. This can increase the deposition density of lithium, and prevent the lithium dendrites from piercing a separator and causing a safety accident, thereby improving the safety and reliability of the electrochemical device. In addition, pores in the porous framework layer provide space for lithium deposition. Therefore, drastic volume changes of the negative electrode caused by the migration of lithium ions between a positive electrode and the negative electrode are avoided during cycling of the electrochemical device, the density of lithium deposition is improved, and the energy density of the electrochemical device is thereby improved. In this application, the current collector layer, the lithium metal layer, and the porous framework layer are arranged in sequence. This may mean that the current collector layer is used as a bottom layer, the lithium metal layer is used as a middle layer, and the porous framework layer is used as an upper layer, which are arranged in sequence. The electrical contact between the current collector layer and the porous framework layer means that the current collector layer contacts the porous framework layer, and a current can be transmitted between the two layers.

In this application, a thickness by which the porous framework layer is intercalated in the lithium metal layer is 0.2 μm to 50 μm, and preferably, 2 μm to 30 μm. For example, a lower limit of the thickness by which the porous framework layer is intercalated in the lithium metal layer may be, but is not limited to, 0.2 μm, 1 μm, 10 μm, 20 μm, or 25 μm; and an upper limit of the thickness by which the porous framework layer is intercalated in the lithium metal layer may be, but is not limited to, 30 μm, 35 μm, 40 μm, 45 μm, or 50 μm. Without being limited to any theory, when the thickness by which the porous framework layer is intercalated in the lithium metal layer is too small (for example, less than 0.2 μm), the contact between the porous framework layer and the lithium metal layer becomes inferior, thereby affecting the electrical contact between the current collector layer and the porous framework layer, and impairing the homogeneity of current transmission. Consequently, during lithium deposition, the deposition speed at some sites is too fast, and then sharp lithium dendrite structures are formed and reduce the safety and reliability of the electrochemical device. When the thickness by which the porous framework layer is intercalated in the lithium metal layer is too great (for example, greater than 50 μm), the energy density of the electrochemical device decreases due to the too great thickness of the porous framework layer.

In an embodiment of this application, a thickness by which the lithium metal layer remains non-intercalated in the porous framework layer is 0.1 μm to 50 μm, and preferably, 1 μm to 30 μm. For example, a lower limit of the thickness by which the lithium metal layer remains non-intercalated in the porous framework layer may be, but is not limited to, 0.2 μm, 1 μm, 10 μm, 20 μm, or 25 μm; and an upper limit of the thickness by which the lithium metal layer remains non-intercalated in the porous framework layer may be, but is not limited to, 30 μm, 35 μm, 40 μm, 45 μm, or 50 μm. Without being limited to any theory, when the thickness by which the lithium metal layer remains non-intercalated in the porous framework layer is too small (for example, less than 0.1 μm), it means that the thickness by which the lithium metal layer is intercalated in the porous framework layer is relatively great, and the amount of lithium metal intercalated in the porous framework layer is relatively large. Consequently, the space formed by the pores in the porous framework layer is insufficient, thereby affecting lithium deposition and deteriorating the cycle performance of the electrochemical device. When the thickness by which the lithium metal layer remains non-intercalated in the porous framework layer is too great (for example, greater than 50 μm), the thickness of the lithium metal layer increases accordingly, and the overall thickness and weight of the electrochemical device increase accordingly. However, the total energy density of the electrochemical device itself will not increase with the increase in the thickness of the lithium metal layer, resulting in a decrease in the energy density of the electrochemical device.

In an embodiment of this application, a thickness of the porous framework layer is 5 μm to 100 μm, and preferably, 20 μm to 60 μm. For example, a lower limit of the thickness of the porous framework layer may be, but is not limited to, 5 μm, 15 μm, 25 μm, 30 μm, 40 μm, or 47 μm; and an upper limit of the thickness of the porous framework layer may be, but is not limited to, 50 μm, 60 μm, 70 μm, 80 μm, 90 μm, or 100 μm. Without being limited to any theory, when the thickness of the porous framework layer is too small (for example, less than 5 μm), a total volume of a space formed by the pores in the porous framework layer is too small, affects the deposition of lithium ions during operation of the electrochemical device, and deteriorates the cycle performance of the electrochemical device. As the thickness of the porous framework layer increases, the total volume of the space formed by the pores in the porous framework layer increases, and the cycle performance of the electrochemical device increases accordingly. However, the thickness of the porous framework layer is hardly effective in increasing the energy density of the electrochemical device itself. When the thickness of the porous framework layer is too great (for example, greater than 100 μm), the energy density of the electrochemical device decreases, and the practical value of the electrochemical device decreases.

In an embodiment of this application, the porous framework layer includes a framework material. A porosity of the framework material is 40% to 95%, and preferably, 60% to 85%. For example, a lower limit of the porosity of the framework material may be, but is not limited to, 40%, 45%, 55%, 60%, or 68%; and an upper limit of the porosity of the framework material may be, but is not limited to, 70%, 75%, 80%, 85%, 90%, or 95%. Without being limited to any theory, when the porosity of the framework material is too small (for example, less than 40%), the total volume of the space formed by the pores in the framework material is too small, and affects the deposition of lithium ions during operation of the electrochemical device, or leads to overflow of a lithium metal layer intercalated in the framework material, and deteriorates the cycle performance of the electrochemical device. When the porosity of the framework material is too great (for example, greater than 95%), the total volume of the space formed by the pores in the framework material is too large. Consequently, strength of the porous framework layer is insufficient, and a prop function of the porous framework layer cannot be exerted, thereby deteriorating the cycle performance of the electrochemical device.

In this application, understandably, the pores of the framework material may include pores of different diameters. For example, the pores include micropores of a diameter less than 2 nm, mesopores of a diameter of 2 nm to 50 nm, and macropores of a diameter greater than 50 nm. In this application, the number of the micropores, mesopores, and macropores is not particularly limited, as long as the objectives of this application can be achieved.

In some embodiments of this application, a ratio of a pore area to a contact area in a contact interface between the current collector layer and the lithium metal layer is less than 10%. For example, the ratio of the pore area to the contact area in the contact interface between the current collector layer and the lithium metal layer may be, but is not limited to, 0.01%, 0.1%, 1%, 2%, 4%, 6%, 8%, or 10%. Understandably, both the current collector layer and the lithium metal layer are metal layers. A surface of the metal layer is generally rough to some extent. Therefore, when the current collector layer contacts the lithium metal layer, there are a contact part and a contactless part. The area of the contact part between the current collector layer and the lithium metal layer is the contact area, and the area of the contactless part between the current collector layer and the lithium metal layer is the pore area. When the ratio of the pore area to the contact area in the contact interface between the current collector layer and the lithium metal layer is greater than 10%, the electrical contact between the current collector layer and the lithium metal layer is affected, homogeneity of current transmission is impaired, and the safety and reliability of the electrochemical device are reduced.

In an embodiment of this application, the lithium metal layer includes lithium and at least one of sodium, aluminum, magnesium, silicon, potassium, calcium, iron, zinc, silver, yttrium, antimony, indium, tin, or boron. In an embodiment, the lithium metal layer according to this application may include lithium metal alone. In another embodiment, the lithium metal layer according to this application may include lithium metal and the foregoing metal or non-metal other than the lithium metal, for example, at least one of sodium, aluminum, magnesium, silicon, potassium, calcium, iron, zinc, silver, yttrium, antimony, indium, tin, or boron. When the lithium metal layer includes lithium metal and the foregoing metal or non-metal other than the lithium metal, the ratio of the lithium metal to other metal or non-metal is not particularly limited, as long as the objectives of this application can be achieved. For example, the ratio of the lithium metal to other metal or non-metal is 5:1 to 100:1.

In an embodiment of this application, the porous framework layer includes a framework material that is at least one of a polymer material, a carbon material, a metal material, or a ceramic material. For example, the polymer material may include at least one of polyethylene oxide, polyimide, polyacrylic acid, polyethylene, polypropylene, polyacrylonitrile, polystyrene, polyvinyl fluoride, polyether ether ketone, polyester, polyvinylidene chloride, polytetrafluoroethylene, or polyethylene terephthalate. The carbon material may include at least one of porous carbon, carbon nanotubes, carbon fibers, hollow carbon spheres, graphene, or a graphene derivative. The metal material may include at least one of copper, nickel, chromium, titanium, tungsten, zirconium, and any alloy thereof. The ceramic material may include at least one of $Li_3PO_4$, $Li_{x1}Ti_{y1}(PO_4)_3$, $Li_{x2}Al_{y2}Ti_{z1}$ $(PO_4)_3$, $Li_{1+x3+y3}M1_{x3}M2_{2-x3}Si_{y3}P_{3-y3}O_{12}$, $Li_{x4}La_{y4}TiO_3$, $Li_{x5}Ge_{y5}P_{z2}S_{w1}$, $Li_{x6}N_{y6}$, $Li_{x7}Si_{y7}S_{z3}$, $Li_{x8}P_{y8}S_{z4}$, $Li_2O$, LiF, LiOH, $Li_2CO_3$, $LiAlO_2$, $Li_4SiO_4$, $Li_2O$—$Al_2O_3$—$SiO_2$— $P_2O_5$—$TiO_2$—$GeO_2$ ceramic, or $Li_{3+x9}La_3M3_2O_{12}$, wherein $0<x1<2$, $0<y1<3$, $0<x2<2$, $0<y2<1$, $0<z1<3$, $0≤x3≤1$, $0≤y3≤1$, $0<x4<2$, $0<y4<3$, $0<x5<4$, $0<y5<1$, $0<w1<5$, $0<z2<1$, $0<x6<4$, $0<y6<2$, $0≤x7<3$, $0<y7<2$, $0<z3<4$, $0≤x8<3$, $0<y8<3$, $0<z4<7$, $0≤x9≤5$, M1 is selected from Al or Ga, M2 is selected from Ti or Ge, and M3 is selected from Te, Nb, or Zr. Without being limited to any theory, when the porous framework layer includes a framework material that is at least one of a polymer material, a carbon material, a metal material, or a ceramic material, the porous framework layer helps to improve the cycle performance of the electrochemical device.

In this application, the preparation method of the framework material is not particularly limited, and a preparation method commonly used in the art may be adopted, for example, an electrospinning method or a template method. The template method may include, but is not limited to, the following steps: filling an internal structure of the template with a material and/or disposing the material on an outer surface of the template, and then removing the template to obtain a porous material. In this application, the template is not particularly limited as long as the objectives of this application can be achieved.

In an embodiment of this application, at least one surface of the framework material is coated with a coating layer. The coating layer includes at least one of $HfO_2$, $SrTiO_3$, $SnO_2$, $CeO_2$, MgO, NiO, CaO, BaO, ZnO, $ZrO_2$, $Y_2O_3$, $Al_2O_3$, $TiO_2$, or $SiO_2$. Specifically, one surface of the framework material may be coated with the coating layer, or both surfaces of the framework material may be coated with the coating layer. The disposed coating layer helps to induce lithium to deposit in the pores of the framework material, thereby helping to increase the deposition density of lithium and increasing the energy density of the electrochemical device. Without being limited by any theory, the coating layer includes a material that is at least one of $HfO_2$, $SrTiO_3$, $SnO_2$, $CeO_2$, MgO, NiO, CaO, BaO, ZnO, $ZrO_2$, $Y_2O_3$, $Al_2O_3$, $TiO_2$, or $SiO_2$, thereby further helping to induce the lithium to deposit in the pores of the framework material. In this application, the thickness of the coating layer is not particularly limited as long as the objectives of this application can be achieved. For example, the thickness of the coating layer is 0.5 nm to 5000 nm.

In this application, the current collector layer of the negative electrode is not particularly limited as long as the objectives of this application can be achieved. For example, the current collector layer of the negative electrode may include a copper foil, a copper alloy foil, a nickel foil, a stainless steel foil, a titanium foil, foamed nickel, foamed copper, or a composite current collector. In this application, the thickness of the current collector layer of the negative electrode is not particularly limited as long as the objectives of this application can be achieved. For example, the thickness of the current collector layer of the negative electrode is 6 μm to 10 μM.

In this application, the positive electrode of the electrochemical device is not particularly limited as long as the objectives of this application can be achieved. For example, the positive electrode generally includes a positive current collector and a positive material layer. In this application, the positive current collector is not particularly limited as long as the objectives of this application can be achieved. For example, the positive current collector may include an aluminum foil, an aluminum alloy foil, a composite current collector, or the like. The positive material layer includes a positive active material. The positive active material is not particularly limited as long as the objectives of this application can be achieved. For example, the positive active material may include at least one of lithium nickel cobalt manganese oxide (811, 622, 523, 111), lithium nickel cobalt aluminum oxide, lithium iron phosphate, a lithium-rich manganese-based material, lithium cobaltate, lithium manganate, lithium manganese iron phosphate, or lithium titanate. In this application, the thicknesses of the positive current collector and the positive material layer are not particularly limited as long as the objectives of this application can be achieved. For example, the thickness of the positive current collector is 8 μm to 12 μm, and the thickness of the positive material layer is 30 μm to 120 μm.

Optionally, the positive electrode may further include a conductive layer. The conductive layer is located between the positive current collector and the positive material layer. The composition of the conductive layer is not particularly limited, and may be a conductive layer commonly used in the art. The conductive layer includes a conductive agent and a binder.

The conductive agent is not particularly limited as long as the objectives of this application can be achieved. For example, the conductive agent may include at least one of conductive carbon black (Super P), carbon nanotubes (CNTs), carbon fibers, flake graphite, Ketjen black, or graphene, or the like. The binder is not particularly limited, and may be any binder well known in the art, as long as the objectives of this application can be achieved. For example, the binder may include at least one of polypropylene alcohol, sodium polyacrylate, potassium polyacrylate, lithium polyacrylate, polyimide, polyamide imide, styrene butadiene rubber (SBR), polyvinyl alcohol (PVA), polyvinylidene difluoride, polytetrafluoroethylene (PTFE), carboxymethyl cellulose, or sodium carboxymethyl cellulose (CMC-Na), or the like. For example, the binder may be styrene butadiene rubber (SBR).

In this application, the separator of the electrochemical device is not particularly limited as long as the objectives of this application can be achieved. For example, the separator may be at least one of: a polyethylene (PE)- and polypropylene (PP)-based polyolefin (PO) separator, a polyester film (such as polyethylene terephthalate (PET) film), a cellulose film, a polyimide film (PI), a polyamide film (PA), a spandex or aramid film, a woven film, a non-woven film (non-woven fabric), a microporous film, a composite film, separator paper, a laminated film, or a spinning film.

For example, the separator may include a substrate layer and a surface treatment layer. The substrate layer may be a non-woven fabric, film or composite film, which, in each case, is porous. The material of the substrate layer may include at least one of polyethylene, polypropylene, polyethylene terephthalate, polyimide, or the like. Optionally, the substrate layer may be a polypropylene porous film, a polyethylene porous film, a polypropylene non-woven fabric, a polyethylene non-woven fabric, or a polypropylene-polyethylene-polypropylene porous composite film. Optionally, a surface treatment layer is disposed on at least one surface of the substrate layer. The surface treatment layer may be a polymer layer or an inorganic compound layer, or a layer formed by mixing a polymer and an inorganic compound.

For example, the inorganic compound layer includes inorganic particles and a binder. The inorganic particles are not particularly limited, and may be at least one selected from: aluminum oxide, silicon oxide, magnesium oxide, titanium oxide, hafnium dioxide, tin oxide, ceria, nickel oxide, zinc oxide, calcium oxide, zirconium oxide, yttrium oxide, silicon carbide, boehmite, aluminum hydroxide, magnesium hydroxide, calcium hydroxide, barium sulfate, or the like. The binder is not particularly limited, and may be one or more selected from polyvinylidene fluoride, vinylidene fluoride-hexafluoropropylene copolymer, polyamide, polyacrylonitrile, polyacrylate, polyacrylic acid, polyacrylic acid sodium salt, polyvinylpyrrolidone, polyvinyl ether, poly methyl methacrylate, polytetrafluoroethylene, or polyhexafluoropropylene. The polymer layer includes a polymer, and the material of the polymer includes at least one of polyamide, polyacrylonitrile, acrylate polymer, polyacrylic acid, polyacrylate, polyvinylpyrrolidone, polyvinyl ether, polyvinylidene fluoride, poly(vinylidene fluoride-hexafluoropropylene), or the like.

The lithium-ion battery according to this application further includes an electrolyte. The electrolyte may be one or more of a gel electrolyte, a solid-state electrolyte, and an electrolytic solution. The electrolytic solution includes a lithium salt and a nonaqueous solvent. In some embodiments of this application, the lithium salt may include at least one of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBOB, or lithium difluoroborate. For example, the lithium salt may be $LiPF_6$ because it provides a high ionic conductivity and improves cycle characteristics.

The nonaqueous solvent may be a carbonate compound, a carboxylate compound, an ether compound, another organic solvent, or any combination thereof. The carbonate compound may be a chain carbonate compound, a cyclic carbonate compound, a fluorocarbonate compound, or any combination thereof. Examples of the chain carbonate compound are dimethyl carbonate (DMC), diethyl carbonate (DEC), dipropyl carbonate (DPC), methyl propyl carbonate (MPC), ethylene propyl carbonate (EPC), ethyl methyl carbonate (EMC), or any combinations thereof. Examples of the cyclic carbonate compound are ethylene carbonate (EC), propylene carbonate (PC), butylene carbonate (BC), vinyl ethylene carbonate (VEC), or any combination thereof. Examples of the fluorocarbonate compound are fluoroethylene carbonate (FEC), 2,2,2-trifluoroethyl methyl carbonate (FEMC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methyl ethylene carbonate, 1-fluoro-1-methyl ethylene carbonate, 1,2-difluoro-1-methyl ethylene carbonate, 1,1,2-trifluoro-2-methyl ethylene carbonate, trifluoromethyl ethylene carbonate, or any combination thereof. Examples of the carboxylate compound are methyl formate, methyl acetate, ethyl acetate, n-propyl acetate, tert-butyl acetate, methyl propionate, ethyl propionate, propyl propionate, γ-butyrolactone, decanolactone, valerolactone, mevalonolactone, caprolactone, or any combinations thereof. Examples of the ether compound are 1,1,2,2-tetrafluoroethyl-2,2,3,3-tetrafluoropropyl ether (TTE), dibutyl ether, tetraglyme, diglyme, 1,2-dimethoxyethane, 1,2-diethoxyethane, ethoxy-methoxyethane, 2-methyltetrahydrofuran, tetrahydrofuran, or any combination thereof. Examples of the other organic solvent are dimethyl sulfoxide, 1,2-dioxolane, sulfolane, methyl sulfolane, 1,3-dimethyl-2-imidazolidinone, N-methyl-2-pyrrolidone, formamide, dimethylformamide, acetonitrile, trimethyl phosphate, triethyl phosphate, trioctyl phosphate, phosphate ester and any combination thereof.

This application further provides an electronic device. The electronic device includes the electrochemical device according to an embodiment of this application, and achieves excellent cycle performance, safety, and reliability.

The electronic device according to this application is not particularly limited, and may be any electronic device known in the prior art. In some embodiments, the electronic device may include, but is not limited to, a notebook computer, a pen-inputting computer, a mobile computer, an e-book player, a portable phone, a portable fax machine, a portable photocopier, a portable printer, a stereo headset, a video recorder, a liquid crystal display television set, a handheld cleaner, a portable CD player, a mini CD-ROM, a transceiver, an electronic notepad, a calculator, a memory card, a portable voice recorder, a radio, a backup power supply, a motor, a car, a motorcycle, a power-assisted bicycle, a bicycle, a lighting appliance, a toy, a game machine, a watch, an electric tool, a flashlight, a camera, a large household battery, a lithium-ion capacitor, and the like.

The preparation process of the electrochemical device is well known to a person skilled in the art, and is not particularly limited in this application. For example, a process of manufacturing the electrochemical device may include: stacking a positive electrode plate and a negative electrode plate that are separated by a separator, fixing four corners of the stacked structure as required, placing the stacked structure into a housing, injecting an electrolytic solution into the housing, and sealing the housing. In addition, an overcurrent prevention element, a guide plate, and the like may be placed into the housing as required, so as to prevent the rise of internal pressure, overcharge, and overdischarge of the electrochemical device.

With the electrochemical device and the electronic device according to this application, during cycling of the electrochemical device, the porous framework layer is partly intercalated in the lithium metal layer. Therefore, the lithium metal layer can replenish lithium consumed during the cycling, thereby improving the cycle performance of the electrochemical device. In addition, the porous framework layer is partly intercalated in the lithium metal layer. The thickness by which the porous framework layer is intercalated in the lithium metal layer is controlled to be 0.2 μm to 50 μm. Due to low rigidity of the lithium metal layer, electrical contact between the current collector layer and the porous framework layer can be effectively improved to ensure homogeneity of current transmission and effectively avoid the generation of lithium dendrites. This can increase the deposition density of lithium, and prevent the lithium dendrites from piercing a separator and causing a safety accident, thereby improving the safety and reliability of the electrochemical device. In addition, pores in the porous framework layer provide space for lithium deposition. Therefore, drastic volume changes of the negative electrode caused by the migration of lithium ions between a positive electrode and the negative electrode are avoided during operation of the electrochemical device, the density of lithium deposition is improved, and the energy density of the electrochemical device is thereby improved.

BRIEF DESCRIPTION OF DRAWINGS

To describe the technical solutions in this application or the prior art more clearly, the following outlines the drawings to be used in the embodiments of this application or the prior art. Evidently, the drawings outlined below are merely a part of embodiments of this application.

Figure 1:
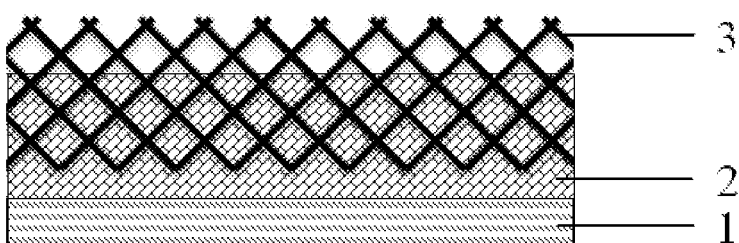
FIG. 1 is a schematic cross-sectional view of a negative electrode plate according to an embodiment of this application.

Reference numerals: 1. Current collector layer; 2. Lithium metal layer; 3. Porous framework layer; and 4. Tab.

DETAILED DESCRIPTION

To make the objectives, technical solutions, and advantages of this application clearer, the following describes this application in more detail with reference to drawings and embodiments. Evidently, the described embodiments are merely a part of but not all of the embodiments of this application. All other embodiments derived by a person of ordinary skill in the art based on the embodiments of this application without making any creative efforts fall within the protection scope of this application.

It needs to be noted that in specific embodiments of this application, this application is construed by using a lithium-ion battery as an example of the electrochemical device, but the electrochemical device according to this application is not limited to the lithium-ion battery.

Figure 2:
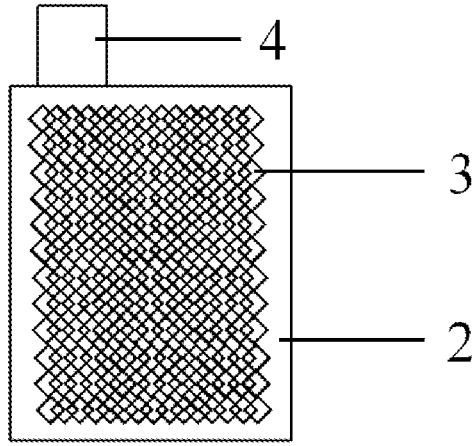
FIG. 2 is a top view of a negative electrode plate according to an embodiment of this application.

FIG. 1 is a schematic cross-sectional view of a negative electrode plate of an electrochemical device according to an embodiment of this application. It can be seen that a porous framework layer 3 is partly intercalated in a lithium metal layer 2, and a current collector layer 1 is disposed in contact with the lithium metal layer 2. FIG. 2 is a top view of the negative electrode plate of the electrochemical device according to an embodiment of this application. It can be seen that the lithium metal layer 2 and the porous framework layer 3 are disposed on a surface of the current collector layer 1 (because the lithium metal layer 2 overlays the surface of the current collector layer 1, the current collector layer 1 is not shown), and a tab 4 is disposed on one side of the negative electrode plate.

EMBODIMENT

The implementations of this application are described below in more detail with reference to embodiments and comparative embodiments. Various tests and evaluations are performed in accordance with the following methods. In addition, unless otherwise specified, "fraction" and "%" are a percent by mass.

Test Methods and Devices:

Testing a Porosity:

Drying a prepared framework material in an 85° C. vacuum oven for 2 hours, taking the framework material out, and placing it in a desiccator to cool down before testing. Wrapping the framework material neatly with A4 paper, spreading it flat on a die-cut mold, and pressing it with a stamping machine. Leaving a sample ready for testing. First, measuring the thickness of the sample by using a micrometer screw gauge, and calculating an apparent volume V1 of the sample based on the surface area and thickness of the sample, and then measuring a true volume V2 of the sample by using a true density meter (model: AccuPycII) to obtain a porosity:

$$porosity=(V1-V2)/V1 \times 100\%.$$

Testing Cycle Performance:

Performing chemical formation on a lithium-ion battery for one cycle at a charge rate and a discharge rate of 0.1 C under a temperature of 60° C., and then charging the battery at a constant current of 0.3 C under a temperature of 25° C. until the voltage reaches 4.2 V, and charging the battery at a constant voltage until the current reaches 0.05 C. Leaving the battery to stand for 5 minutes, and then discharging the battery at a current of 1 C until the voltage reaches 2.8 V. Using the capacity obtained in this step as an initial capacity, performing a cycle test in which the battery is charged at 0.3 C and discharged at 1 C, comparing the capacity obtained in each step with the initial capacity to obtain ratios, and obtaining a capacity attenuation curve based on the ratios. When the capacity retention rate reaches 80% in the cycle test under 25° C., recording the number of cycles as the room-temperature cycle performance of the lithium-ion battery.

Embodiment 1

<Preparing a Negative Electrode Plate>

Preparing a polyacrylonitrile nanofiber film based on an electrospinning technique by using polyacrylonitrile as a precursor, where a mass concentration of a spinning solution is 12%, a spinning voltage is 20 kV, and a spinning flow rate is 1 mL/h. Heating the obtained polyacrylonitrile nanofiber film in a 210° C. atmospheric environment for 1 hour, and then heating the film in a 900° C. argon atmosphere for 3 hours to obtain a carbon film. Then depositing a 10 nm-thick zinc oxide coating layer on the surface of the carbon film by using an atomic layer deposition (ALD) technique, so as to obtain a 55 μm-thick framework material (the thickness of the framework material may be selected depending on the embodiment).

Stacking a 20 μm-thick lithium metal foil on a 10 μm-thick nickel metal foil serving as a negative current collector, and exerting a pressure of 5 tons in a cold-calendering machine to compound the lithium metal foil and the nickel metal foil together to obtain a composite metal foil. Then placing the composite metal foil in a hot-calendering machine, with the lithium metal foil side facing upward. After heating to 300° C., placing the prepared framework material on the lithium metal foil side of the composite metal foil, and exerting a pressure of 5 tons so that the framework material enters the lithium metal slowly. In the composite metal foil, the thickness by which the lithium metal foil is intercalated in the framework material is 10 μm, and the thickness by which the lithium metal foil remains non-intercalated in the framework material is 10 μm. The thickness of the porous framework layer obtained after the framework material is cold-calendered is 50 μm, thereby obtaining a negative electrode plate. Then cutting the negative electrode plate into a size of 40 mm×60 mm, welding tabs, and leaving the negative electrode plate ready for use. The lithium metal foil is made of pure lithium.

<Preparing a Positive Electrode Plate>

Mixing NCM (Li(Ni$_{0.8}$Co$_{0.1}$Mn$_{0.1}$)O$_2$) as a ternary positive active material, nano conductive carbon black, and polyvinylidene difluoride (PVDF) at a mass ratio of 97.5: 1.0:1.5, adding N-methyl-pyrrolidone (NMP) as a solvent, blending the mixture into a slurry with a solid content of 75%, and stirring the slurry evenly. Coating one surface of a 10 μm-thick positive current collector aluminum foil with the slurry evenly, and drying the slurry at a temperature of 90° C. to obtain a positive electrode plate coated with a 110 μm-thick coating layer. A single side of the positive electrode plate has been coated upon completion of the forego-ing steps. Then repeating the foregoing steps on the other surface of the positive electrode plate to obtain a positive electrode plate coated with the positive active material on both sides. Cutting the positive electrode plate into a size of 38 mm×58 mm after completion of the coating, welding tabs, and leaving the positive electrode plate ready for use.

<Preparing an Electrolytic Solution>

Mixing fluoroethylene carbonate (FEC), 2,2,2-trifluoro-ethyl methyl carbonate (FEMC), ethylene carbonate (EC), and 1,1,2,2-tetrafluoroethyl-2,2,3,3-tetrafluoropropyl ether (TTE) at a mass ratio of FEC:FEMC:EC:TTE=2:3:2:3 in a dry argon atmosphere to obtain an organic solvent, and then adding lithium hexafluorophosphate as a lithium salt into the organic solvent, dissolving the lithium salt, and mixing the organic solvent evenly to obtain an electrolytic solution in which the lithium salt concentration is 1 Mol/L.

<Preparing a Separator>

Using a 15 μm-thick polyethylene (PE) film (manufac-tured by Celgard) as a separator.

<Preparing a Lithium-Ion Battery>

Placing the prepared negative electrode plate in the middle, placing positive electrode plates on two sides of the negative electrode plate respectively, and placing a separator between each positive electrode plate and the negative electrode plate. After stacking the plates, fixing four corners of the entire stacked structure, placing the stacked structure into an aluminum plastic film packaging bag, and perform-ing steps such as top-and-side sealing, electrolyte injection, standing, chemical formation, and shaping to obtain a lithium metal battery.

In Embodiment 2, Embodiment 3, Embodiment 4, Embodiment 5, Embodiment 6, Embodiment 7, Embodi-ment 8, Embodiment 9, Embodiment 10, Embodiment 11, Embodiment 12, Embodiment 13, Embodiment 14. Embodi-ment 15, Embodiment 16, Embodiment 17, Embodiment 18, Embodiment 19, Embodiment 20, Embodiment 21, Embodi-ment 22, Embodiment 23, Embodiment 24, Embodiment 25, Embodiment 26, Embodiment 27, Embodiment 28, Embodi-ment 29, Embodiment 30, Embodiment 31, Embodiment 32, and Embodiment 33, steps of <Preparing a negative elec-trode plate>, <Preparing a positive electrode plate>, <Pre-paring an electrolytic solution>, <Preparing a separator>, and <Preparing a lithium-ion battery> are the same as those described in Embodiment 1, and the changes in the relevant preparation parameters are shown in Table 1.

Embodiment 34

Except that in the steps of <Preparing a negative electrode plate>, polyimide (PI) is used as a precursor, a polyimide nanofiber film is prepared by using an electrospinning technique, the spinning voltage is 18 kV, and the spinning flow rate is 1 mL/h, and the obtained polyimide nanofiber film is heated in a 210° C. atmospheric environment for 1 hour, and then heated in a 900° C. argon atmosphere for 3 hours to obtain a carbon film, the remainder is the same as in Embodiment 1.

Embodiment 35

Except that in the steps of <Preparing a negative electrode plate>, polyvinylpyrrolidone (PVP) is used as a precursor, a polyvinylpyrrolidone nanofiber film is prepared by using an electrospinning technique, the spinning voltage is 15 kV, and the spinning flow rate is 1 mL/h, and the obtained polyvi-nylpyrrolidone nanofiber film is heated in a 210° C. atmospheric environment for 1 hour, and then heated in a 900° C. argon atmosphere for 3 hours to obtain a carbon film, the remainder is the same as in Embodiment 1.

Embodiment 36

Except that in the steps of <Preparing a negative electrode plate>, the carbon film is replaced with a porous $Li_7La_3Zr_2O_{12}$ (LLZO) fiber film, the remainder is the same as in Embodiment 1.

The steps of preparing the porous LLZO fiber film are as follows:

Adding lithium nitrate ($LiNO_3$), lanthanum nitrate hexa-hydrate ($La(NO_3)_3 6H_2O$), and zirconium nitrate hexahy-drate ($Zr(NO_3)_2 6H_2O$) at a molar ratio of 8:3:2 into a dimethylformamide (DMF) solution containing 10 wt % polyvinylpyrrolidone (PVP), where the mass concentration of the spinning solution is 12%, the LLZO fiber film is prepared by electrospinning, the spinning voltage is 20 kV, and the spinning flow rate is 1 mL/h. Heating the obtained LLZO fiber film in a 280° C. atmospheric environment for 2 hours, and then heating the LLZO fiber film in an 800° C. atmospheric environment for 2 hours to obtain a porous LLZO fiber film.

Embodiment 37

Except that in the steps of <Preparing a negative electrode plate>, the carbon film is replaced with porous Ti, the remainder is the same as in Embodiment 1.

Embodiment 38

Except that in the steps of <Preparing a negative electrode plate>, the carbon film is replaced with porous W, the remainder is the same as in Embodiment 1.

Embodiment 39

Except that in the steps of <Preparing a negative electrode plate>, the carbon film is replaced with a porous $Li_{1.3}Al_{0.3}Ti_{1.7}(PO_4)_3$ (LATP) fiber film, the remainder is the same as in Embodiment 1.

The steps of preparing the porous LATP fiber film are as follows:

Mixing a polyvinylidene difluoride-hexafluoropropylene (PVDF-HFP), tetrahydrofuran (THF), and DMF at a mass ratio of 0.4:10:10 to obtain a solution A, mixing titanium tetraisopropoxide ($Ti(OiPr)_4$) and acetyl acetone ($C_5H_8O_2$) at a molar ratio of 1:2 to obtain a solution B, mixing phenylphosphonic acid ($PhPO_3H_2$), $Al(NO_3)_3 9H_2O$, and lithium nitrate ($LiNO_3$) at a molar ratio of 1.6:0.4:1.4 to obtain a solution C, and then mixing the solution A, the solution B, and the solution C, where the mass concentration of the spinning solution is 12%, an LATP fiber film is prepared by electrospinning, the spinning voltage is 20 kV, and the spinning flow rate is 1 mL/h. Heating the obtained LATP fiber film in an 850° C. atmospheric environment for 2 hours to obtain a porous LATP fiber film.

Embodiment 40

Except that in the steps of <Preparing a negative electrode plate>, the lithium metal foil is replaced with a lithium-aluminum composite metal foil (the mass ratio of lithium to aluminum is 20:1), the remainder is the same as in Embodi-ment 1.

Embodiment 41

Except that in the steps of <Preparing a negative electrode plate>, the lithium metal foil is replaced with a lithium-magnesium metal foil (the mass ratio of lithium to magnesium is 10:1), the remainder is the same as in Embodiment 1.

Embodiment 42

Except that in the steps of <Preparing a negative electrode plate>, the zinc oxide coating layer is replaced with a titanium dioxide ($TiO_2$) coating layer, the remainder is the same as in Embodiment 1.

Comparative Embodiment 1

<Preparing a Negative Electrode Plate>

Stacking a 20 am-thick lithium metal foil on a 10 am-thick nickel metal foil serving as a negative current collector, and exerting a pressure of 5 tons in a cold-calendering machine to compound the lithium metal foil and the nickel metal foil together to obtain a composite metal foil, thereby obtaining a negative electrode plate, the remainder is the same as in Embodiment 1.

Comparative Embodiment 2

Except that in the steps of <Preparing a negative electrode plate>, the framework material is stacked on a 10 am-thick nickel metal foil serving as a negative current collector, and a pressure of 5 tons is exerted in a cold-calendering machine to compound the framework material and the nickel metal foil together to obtain a negative electrode plate, where the thickness of the porous framework layer after the cold-calendering is 50 μm, the remainder is the same as in Embodiment 1.

Comparative Embodiment 3

Except that in the steps of <Preparing a negative electrode plate>, the metallic lithium is placed in a stainless steel crucible in a dry argon atmosphere, and heated to 300° C. so that the solid-state metallic lithium is melted into a liquid state, one side of the framework material contacts the molten lithium, and the pores of the framework material are spontaneously filled with lithium metal to obtain a composite framework material; in the argon atmosphere, the water content is less than 1 ppm, the oxygen content is less than 1 ppm, and the framework material is filled with the lithium metal by a thickness of 20 μm; and then a pressure of 5 tons is exerted in a cold-calendering machine to compound the 10 μm-thick negative current collector and the composite framework material together to obtain a negative electrode plate, the remainder is the same as in Embodiment 1.

Comparative Embodiment 4

Except that in the steps of <Preparing a negative electrode plate>, a 20 μm-thick lithium metal foil is stacked on a 10 μm-thick nickel metal foil serving as a negative current collector to obtain a composite metal foil; then the composite metal foil is placed in a hot-calendering machine, with the lithium metal foil side facing upward; after the composite metal foil is heated to 300° C., the framework material is placed on the composite metal foil, and a pressure of 5 tons is exerted so that the framework material enters the lithium metal slowly; in the composite metal foil, the thickness by which the lithium metal foil is intercalated in the framework material is 10 μm, and the thickness by which the lithium metal foil remains non-intercalated in the framework material is 10 μm; the thickness of the porous framework layer obtained after the cold-calendering is 50 μm, thereby obtaining a negative electrode plate, the remainder is the same as in Embodiment 1.

The steps of <Preparing a negative electrode plate>, <Preparing a positive electrode plate>, <Preparing an electrolytic solution>, <Preparing a separator>, and <Preparing a lithium-ion battery> in Comparative Embodiment 5, Comparative Embodiment 6, Comparative Embodiment 7, and Comparative Embodiment 8 are the same as those described in Embodiment 1, and the changes in the relevant preparation parameters are shown in Table 1.

The preparation parameters and the test results of each embodiment and comparative embodiment are shown in Table 1:

TABLE 1

| | Framework material | Lithium metal layer material | Thickness of lithium metal foil (μm) | Thickness by which the porous framework layer is intercalated in the lithium metal layer (μm) | Thickness by which the lithium metal layer remains non-intercalated in the porous framework layer (μm) | Thickness of porous framework layer (μm) | Porosity of framework material | Number of cycles corresponding to an 80% capacity retention rate |
|---|---|---|---|---|---|---|---|---|
| Embodiment 1 | C | Li | 20 | 10 | 10 | 50 | 80% | 180 |
| Embodiment 2 | C | Li | 15 | 10 | 5 | 50 | 80% | 150 |
| Embodiment 3 | C | Li | 11 | 10 | 1 | 50 | 80% | 120 |
| Embodiment 4 | C | Li | 30 | 10 | 20 | 50 | 80% | 250 |
| Embodiment 5 | C | Li | 40 | 10 | 30 | 50 | 80% | 280 |
| Embodiment 6 | C | Li | 50 | 10 | 40 | 50 | 80% | 300 |
| Embodiment 7 | C | Li | 60 | 10 | 50 | 50 | 80% | 305 |
| Embodiment 8 | C | Li | 20 | 5 | 15 | 50 | 80% | 190 |
| Embodiment 9 | C | Li | 20 | 15 | 5 | 50 | 80% | 195 |
| Embodiment 10 | C | Li | 20 | 19 | 1 | 50 | 80% | 135 |
| Embodiment 11 | C | Li | 20 | 19.5 | 0.5 | 50 | 80% | 135 |
| Embodiment 12 | C | Li | 20 | 19.9 | 0.1 | 50 | 80% | 130 |
| Embodiment 13 | C | Li | 15 | 14.5 | 0.5 | 50 | 80% | 150 |
| Embodiment 14 | C | Li | 15 | 14.9 | 0.1 | 50 | 80% | 140 |
| Embodiment 15 | C | Li | 20 | 10 | 10 | 45 | 80% | 175 |
| Embodiment 16 | C | Li | 20 | 10 | 10 | 40 | 80% | 160 |
| Embodiment 17 | C | Li | 20 | 10 | 10 | 35 | 80% | 130 |
| Embodiment 18 | C | Li | 20 | 2 | 18 | 30 | 80% | 170 |

TABLE 1-continued

| | Framework material | Lithium metal layer material | Thickness of lithium metal foil (μm) | Thickness by which the porous framework layer is intercalated in the lithium metal layer (μm) | Thickness by which the lithium metal layer remains non-intercalated in the porous framework layer (μm) | Thickness of porous framework layer (μm) | Porosity of framework material | Number of cycles corresponding to an 80% capacity retention rate |
|---|---|---|---|---|---|---|---|---|
| Embodiment 19 | C | Li | 10 | 0.2 | 9.8 | 5 | 80% | 500 |
| Embodiment 20 | C | Li | 20 | 10 | 10 | 60 | 80% | 190 |
| Embodiment 21 | C | Li | 20 | 10 | 10 | 70 | 80% | 190 |
| Embodiment 22 | C | Li | 20 | 10 | 10 | 100 | 80% | 200 |
| Embodiment 23 | C | Li | 20 | 10 | 10 | 50 | 85% | 170 |
| Embodiment 24 | C | Li | 20 | 10 | 10 | 50 | 90% | 150 |
| Embodiment 25 | C | Li | 20 | 10 | 10 | 50 | 95% | 120 |
| Embodiment 26 | C | Li | 20 | 10 | 10 | 50 | 75% | 220 |
| Embodiment 27 | C | Li | 20 | 10 | 10 | 50 | 70% | 210 |
| Embodiment 28 | C | Li | 20 | 10 | 10 | 50 | 65% | 180 |
| Embodiment 29 | C | Li | 20 | 10 | 10 | 50 | 60% | 150 |
| Embodiment 30 | C | Li | 20 | 10 | 10 | 100 | 40% | 160 |
| Embodiment 31 | C | Li | 40 | 30 | 10 | 60 | 80% | 240 |
| Embodiment 32 | C | Li | 50 | 40 | 10 | 70 | 80% | 260 |
| Embodiment 33 | C | Li | 60 | 50 | 10 | 80 | 80% | 270 |
| Embodiment 34 | C | Li | 20 | 10 | 10 | 50 | 80% | 150 |
| Embodiment 35 | C | Li | 20 | 10 | 10 | 50 | 80% | 170 |
| Embodiment 36 | LLZO | Li | 20 | 10 | 10 | 50 | 80% | 160 |
| Embodiment 37 | Ti | Li | 20 | 10 | 10 | 50 | 80% | 160 |
| Embodiment 38 | W | Li | 20 | 10 | 10 | 50 | 80% | 155 |
| Embodiment 39 | LATP | Li | 20 | 10 | 10 | 50 | 80% | 145 |
| Embodiment 40 | C | Li—Al | 20 | 10 | 10 | 50 | 80% | 175 |
| Embodiment 41 | C | Li—Mg | 20 | 10 | 10 | 50 | 80% | 190 |
| Embodiment 42 | C | Li | 20 | 10 | 10 | 50 | 80% | 190 |
| Comparative Embodiment 1 | / | Li | 20 | / | / | / | / | 60 |
| Comparative Embodiment 2 | C | / | / | / | / | 50 | 80% | 20 |
| Comparative Embodiment 3 | C | / | / | / | / | 50 | 80% | 80 |
| Comparative Embodiment 4 | C | Li | 20 | 10 | 10 | 50 | 80% | 50 |
| Comparative Embodiment 5 | C | Li | 20 | 10 | 10 | 50 | 30% | 80 |
| Comparative Embodiment 6 | C | Li | 20 | 10 | 10 | 50 | 98% | 70 |
| Comparative Embodiment 7 | C | Li | 20 | 0.05 | 19.95 | 50 | 80% | 100 |
| Comparative Embodiment 8 | C | Li | 70 | 60 | 10 | 70 | 80% | 75 |

Note:
"/" in Table 1 indicates that there is no corresponding preparation parameter or the corresponding lithium-ion battery cannot be assembled and cannot be tested for performance.

The thickness by which the porous framework layer is intercalated in the lithium metal layer generally affects the cycle performance of the lithium-ion battery. As can be seen from Embodiments 1 to 42 and Comparative Embodiments 7 and 8, a lithium-ion battery of excellent cycle performance can be obtained as long as the thickness by which the porous framework layer is intercalated in the lithium metal layer falls within the range specified in this application.

As can be seen from Embodiments 8, 9, 10, 11, and 12, as the thickness by which the porous framework layer is intercalated in the lithium metal layer increases, the cycle performance of the lithium-ion battery improves first, and then declines. A lithium-ion battery of excellent cycle performance can be obtained as long as the thickness by which the porous framework layer is intercalated in the lithium metal layer falls within the range specified in this application.

As can be seen from Embodiments 11 and 13 as well as Embodiments 12 and 14, when the thickness by which the lithium metal layer remains non-intercalated in the porous framework layer is unchanged, the cycle performance of the lithium-ion battery is improved to some extent by reducing the thickness of the lithium metal foil within the range specified in this application, as long as the thickness by which the porous framework layer is intercalated in the lithium metal layer falls within the range specified in this application.

As can be seen from Embodiments 1, 2, 3, 4, 5, 6, and 7, the increase in the thickness of the lithium metal foil can improve the cycle performance of the lithium-ion battery to some extent.

As can be seen from Embodiments 15, 16, 17, 20, 21, and 22, when the thickness of the lithium metal foil remains unchanged, as the thickness of the porous framework layer gradually increases, the cycle performance of the lithium-ion battery is improved to some extent. Further, as can be seen from Embodiments 1, 15, 16, 17, 18, 19, 20, 21, and 22, a lithium-ion battery of excellent cycle performance can be obtained as long as the thickness of the porous framework layer falls within the range specified in this application.

As can be seen from Embodiments 23, 24, 25, 26, 27, 28, 29, and 30, and Comparative Embodiments 5 and 6, a lithium-ion battery containing a framework material of the porosity specified in this application achieves excellent cycle performance.

Further, as can be seen from Embodiments 23, 24, 25, 26, 27, 28, 29, and 30, as the porosity of the framework material increases, the cycle performance of the lithium-ion battery improves first, and then declines. A lithium-ion battery of excellent cycle performance can be obtained as long as the porosity of the framework material falls within the range specified in this application.

As can be seen from Embodiments 31, 32, and 33, when both the thickness of the lithium metal foil and the thickness by which the porous framework layer is intercalated in the lithium metal layer are increased concurrently, as long as the thickness of the lithium metal foil and the thickness by which the porous framework layer is intercalated in the lithium metal layer fall within the range specified in this application, the lithium-ion battery still achieves excellent cycle performance.

As can be seen from Embodiments 34, 35, 36, 37, 38, 39, 40, 41, and 42, the obtained lithium-ion battery achieves excellent cycle performance as long as the lithium metal foil, the framework material, and the coating layer of the framework material adopt the materials provided in this application, that is, fall within the protection scope of this application.

As can be seen from Comparative Embodiments 1, 2, 3, and 4, when the framework material is lacking, or the current collector is lacking, or the framework material is not intercalated in the lithium metal layer, or the ratio of the pore area to the contact area in the contact interface between the current collector layer and the lithium metal layer is greater than 10% (in Comparative Embodiment 4, 20%) due to omission of cold-calendering of the current collector or the lithium metal foil, the cycle performance of the obtained lithium-ion battery is inferior and cannot meet the requirements of practical applications.

As can be seen from the foregoing analysis, the obtained lithium-ion battery achieves excellent cycle performance as long as the lithium-ion battery falls within the protection scope of the electrochemical device according to this application.

The foregoing descriptions are merely preferred embodiments of this application, but are not intended to limit this application. Any modifications, equivalent substitutions, and improvements made within the spirit and principles of this application fall within the protection scope of this application.

What is claimed is:

1. An electrochemical device, comprising: a negative electrode; wherein the negative electrode comprises a current collector layer, a lithium metal layer, and a porous framework layer that are arranged in sequence; the porous framework layer is partly intercalated in the lithium metal layer, and a thickness by which the porous framework layer is intercalated in the lithium metal layer is 0.2 $\mu$m to 50 $\mu$m;

wherein a thickness by which the lithium metal layer remains non-intercalated by the porous framework layer is 0.1 $\mu$m to 50 $\mu$m;

wherein the porous framework layer comprises a metal material.

2. The electrochemical device according to claim 1, wherein a thickness of the porous framework layer is 5 $\mu$m to 100 $\mu$m.

3. The electrochemical device according to claim 1, wherein the porous framework layer comprises a framework material, and a porosity of the framework material is 40% to 95%.

4. The electrochemical device according to claim 1, wherein a ratio of a pore area to a contact area in a contact interface between the current collector layer and the lithium metal layer is greater than 1% and less than 10%.

5. The electrochemical device according to claim 1, wherein the lithium metal layer comprises lithium and at least one of sodium, aluminum, magnesium, silicon, potassium, calcium, iron, zinc, silver, yttrium, antimony, indium, tin, or boron.

6. The electrochemical device according to claim 1, wherein the metal material comprises at least one selected from the group consisting of copper, nickel, chromium, titanium, tungsten, zirconium, and any alloy thereof; and wherein the porous framework layer further comprises at least one of a polymer material, a carbon material, or a ceramic material;

the polymer material comprises at least one of polyethylene oxide, polyimide, polyacrylic acid, polyethylene, polypropylene, polyacrylonitrile, polystyrene, polyvinyl fluoride, polyether ether ketone, polyester, polyvinylidene chloride, polytetrafluoroethylene, or polyethylene terephthalate;

the carbon material comprises at least one of porous carbon, carbon nanotubes, carbon fibers, hollow carbon spheres, graphene, or a graphene derivative;

the ceramic material comprises at least one of $Li_3PO_4$, $Li_{x1}Ti_{y1}(PO_4)_3$, $Li_{x2}Al_{y2}Ti_{z1}(PO_4)_3$, $Li_{1+x3+y3}M1_{x3}M2_{2-x3}Si_{y3}P_{3-y3}O_{12}$, $Li_{x4}La_{y4}TiO_3$, $Li_{x5}Ge_{y5}P_{z2}S_{w1}$, $Li_{x6}N_{y6}$, $Li_{x7}Si_{y7}S_{z3}$, $Li_{x8}P_{y8}S_{z4}$, $Li_2O$, LiF, LiOH, $Li_2CO_3$, $LiAlO_2$, $Li_4SiO_4$, $Li_2O$—$Al_2O_3$—$SiO_2$—$P_2O_5$—$TiO_2$—$GeO_2$ ceramic, or $Li_{3+x9}La_3M3_2O_{12}$, wherein $0<x1<2$, $0<y1<3$, $0<x2<2$, $0<y2<1$, $0<z1<3$, $0\le x3\le1$, $0\le y3\le1$, $0<x4<2$, $0<y4<3$, $0<x5<4$, $0<y5<1$, $0<w1<5$, $0<z2<1$, $0<x6<4$, $0<y6<2$, $0\le x7<3$, $0<y7<2$, $0<z3<4$, $0\le x8<3$, $0<y8<3$, $0<z4<7$, $0\le x9\le5$, M1 is selected from Al or Ga, M2 is selected from Ti or Ge, and M3 is selected from Te, Nb, or Zr.

7. The electrochemical device according to claim 6, wherein at least one surface of the framework material is coated with a coating layer, and the coating layer comprises at least one of $HfO_2$, $SrTiO_3$, $SnO_2$, $CeO_2$, MgO, NiO, CaO, BaO, ZnO, $ZrO_2$, $Y_2O_3$, $Al_2O_3$, $TiO_2$, or $SiO_2$.

8. The electrochemical device according to claim 1, wherein the thickness by which the porous framework layer is intercalated in the lithium metal layer is 2 $\mu$m to 30 $\mu$m.

9. The electrochemical device according to claim 1, wherein the thickness by which the lithium metal layer remains non-intercalated by the porous framework layer is 10 $\mu$m to 50 $\mu$m.

10. An electronic device, comprising: an electrochemical device, the electrochemical device comprises a negative electrode; wherein the negative electrode comprises a current collector layer, a lithium metal layer, and a porous framework layer that are arranged in sequence; the porous framework layer is partly intercalated in the lithium metal layer, and a thickness by which the porous framework layer is intercalated in the lithium metal layer is 0.2 $\mu$m to 50 $\mu$m;

wherein a thickness by which the lithium metal layer remains non-intercalated by the porous framework layer is 0.1 $\mu$m to 50 $\mu$m;

wherein the porous framework layer comprises a metal material.

11. The electronic device according to claim 10, wherein a thickness of the porous framework layer is 5 $\mu$m to 100 $\mu$m.

12. The electronic device according to claim 10, wherein the porous framework layer comprises a framework material, and a porosity of the framework material is 40% to 95%.

13. The electronic device according to claim 10, wherein a ratio of a pore area to a contact area in a contact interface between the current collector layer and the lithium metal layer is greater than 1% and less than 10%.

14. The electronic device according to claim 10, wherein the lithium metal layer comprises lithium and at least one of sodium, aluminum, magnesium, silicon, potassium, calcium, iron, zinc, silver, yttrium, antimony, indium, tin, or boron.

15. The electronic device according to claim 10, wherein the metal material comprises at least one selected from the group consisting of copper, nickel, chromium, titanium, tungsten, zirconium, and any alloy thereof; and wherein the porous framework layer further comprises at least one of a polymer material, a carbon material, or a ceramic material;

the polymer material comprises at least one of polyethylene oxide, polyimide, polyacrylic acid, polyethylene, polypropylene, polyacrylonitrile, polystyrene, polyvinyl fluoride, polyether ether ketone, polyester, polyvinylidene chloride, polytetrafluoroethylene, or polyethylene terephthalate;

the carbon material comprises at least one of porous carbon, carbon nanotubes, carbon fibers, hollow carbon spheres, graphene, or a graphene derivative; and the ceramic material comprises at least one of $Li_3PO_4$, $Li_{x1}Ti_{y1}(PO_4)_3$, $Li_{x2}Al_{y2}Ti_{z1}(PO_4)_3$, $Li_{1+x3+y3}M1_{x3}M2_{2-x3}Si_{y3}P_{3-y3}O_{12}$, $Li_{x4}La_{y4}TiO_3$, $Li_{x5}Ge_{y5}P_{z2}S_{w1}$, $Li_{x6}N_{y6}$, $Li_{x7}Si_{y7}S_{z3}$, $Li_{x8}P_{y8}S_{z4}$, $Li_2O$, LiF, LiOH, $Li_2CO_3$, $LiAlO_2$, $Li_4SiO_4$, $Li_2O$—$Al_2O_3$—$SiO_2$—$P_2O_5$—$TiO_2$—$GeO_2$ ceramic, or $Li_{3+x9}La_3M3_2O_{12}$, wherein $0<x1<2$, $0<y1<3$, $0<x2<2$, $0<y2<1$, $0<z1<3$, $0\leq x3\leq 1$, $0\leq y3\leq 1$, $0<x4<2$, $0<y4<3$, $0<x5<4$, $0<y5<1$, $0<w1<5$, $0<z2<1$, $0<x6<4$, $0<y6<2$, $0<x7<3$, $0<y7<2$, $0<z3<4$, $0\leq x8<3$, $0<y8<3$, $0<z4<7$, $0\leq x9\leq 5$, M1 is selected from Al or Ga, M2 is selected from Ti or Ge, and M3 is selected from Te, Nb, or Zr.

16. The electronic device according to claim 15, wherein at least one surface of the framework material is coated with a coating layer, and the coating layer comprises at least one of $HfO_2$, $SrTiO_3$, $SnO_2$, $CeO_2$, MgO, NiO, CaO, BaO, ZnO, $ZrO_2$, $Y_2O_3$, $Al_2O_3$, $TiO_2$, or $SiO_2$.

17. The electronic device according to claim 10, wherein the thickness by which the porous framework layer is intercalated in the lithium metal layer is 2 μm to 30 μm.

* * * * *